United States Patent [19]

Meybeck et al.

[11] 4,046,757

[45] Sept. 6, 1977

[54] 2-OPTIONALLY SUBSTITUTED ALKYL-AND PHENYLSULFONYLPHENYL-AZO-PHENYL DYES AND A PROCESS FOR THEIR SYNTHESIS

[75] Inventors: Jacques Meybeck; Curt Mueller, both of Binningen; Fred Mueller, Munchenstein, all of Switzerland

[73] Assignee: Sandoz Ltd., Basel, Switzerland

[21] Appl. No.: 860,403

[22] Filed: Sept. 23, 1969

[30] Foreign Application Priority Data

Oct. 18, 1968 Switzerland .................. 15612/68

[51] Int. Cl.$^2$ ............................................ C09B 43/02
[52] U.S. Cl. .................................. 260/207; 260/152; 260/156; 260/157; 260/158; 260/205; 260/206; 260/207; 260/207.5; 260/208
[58] Field of Search ............ 260/205, 206, 207, 207.1, 260/207.3, 207.5

[56] References Cited

U.S. PATENT DOCUMENTS

| | | | |
|---|---|---|---|
| 3,406,164 | 10/1968 | Altermatt et al. | 260/207 |
| 3,407,189 | 10/1968 | Merian | 260/207.1 |
| 3,417,076 | 12/1968 | Sartori | 260/207 X |
| 3,428,622 | 2/1969 | Altermatt et al. | 260/207 |
| 3,522,235 | 7/1970 | Baron et al. | 260/207 |
| 3,533,722 | 10/1970 | Wegmuller | 8/26 |
| 3,692,769 | 9/1972 | Weaver et al. | 260/207.1 |
| 3,772,267 | 11/1973 | Cornelius et al. | 260/207.1 |

FOREIGN PATENT DOCUMENTS

| | | | |
|---|---|---|---|
| 1,511,932 | 9/1967 | France | 260/207.1 |
| 1,719,066 | 2/1971 | Germany | 260/207 |
| 422,194 | 4/1967 | Switzerland | 260/207.1 |
| 1,125,683 | 8/1968 | United Kingdom | 260/207.1 |

OTHER PUBLICATIONS

R. Otto, *Berichte der Deutschen Chemische Gesellschaft,* Band 13, (1880), pp. 1272-1282.
R. Otto, *Annalen der Chemie,* 283 (1894), pp. 181-183.

Wagner & Zook, *Synthetic Organic Chemistry,* John Wiley & Sons, Inc., New York, 1953, pp. 801-802.

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

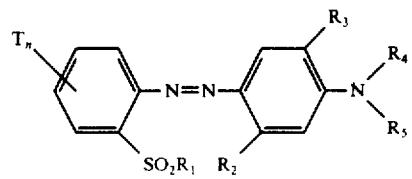

wherein $R_1$ is optionally substituted hydrocarbyl (alkyl or phenyl), $R_2$ is hydrogen, alkyl or acylamino, $R_3$ is hydrogen, alkyl, substituted alkyl, alkoxy or substituted alkoxy, each of $R_4$ and $R_5$ is independently hydrogen, alkyl or substituted alkyl, T is halo, nitro, cyano, alkyl, alkoxy, alkylsulfonyl, sulfamoyl or alkylsulfamoyl, and n is 0 to 3. These compounds are suitable for the dyeing and printing of textile materials. The dyeings obtained are extremely fast to thermofixation, sublimation, pleating, gas fumes, cross dyeing, rubbing, dry cleaning, chlorine, and wet treatments, such as water, washing and perspiration. The compounds of this invention and other phenylazo-phenyl compounds with an optionally substituted hydrocarbylsulfonyl group ($R_1$—$SO_2$—) on the diazo component radical in a position ortho to the azo group can be synthesized from the corresponding compounds having a halo atom or nitro group in this position by reaction with a compound of the formula H—$SO_2$—$R_1$ or a salt thereof.

26 Claims, No Drawings

2-OPTIONALLY SUBSTITUTED ALKYL-AND PHENYLSULFONYLPHENYL-AZO-PHENYL DYES AND A PROCESS FOR THEIR SYNTHESIS

It has been found that azo compounds of the formula

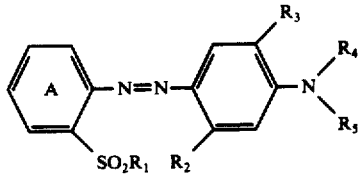

in which

- $R_1$ stands for a hydrocarbon radical which may be substituted and/or may contain hetero atoms,
- $R_2$ for a hydrogen atom, an alkyl group or acylamino group which may be substituted,
- $R_3$ for a hydrogen atom or an alkyl or alkoxy group which may be substituted,
- $R_4$ for a hydrogen atom or an alkyl group which may be substituted and
- $R_5$ for a hydrogen atom or an alkyl group which may be substituted by halogen atoms or by cyano alkoxy, phenyl, phenoxy, pyridyl, acyl, acyloxy, amino, alkylamino, or acylamino groups which may bear further substituents, and where the nucleus A may bear further substituents, can be obtained by condensing 1 mole of an azo compound of the formula

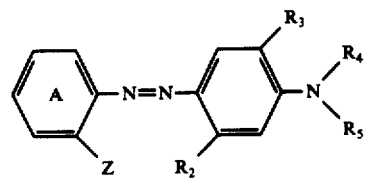

where

Z represents a halogen atom or a nitro group, with 1 mole of a sulphinate of the formula

$$H-SO_2-R_1 \quad (III)$$

or of a salt thereof.

Examples of suitable substituents on the alkyl or alkoxy groups, which contain preferably 1, 2, 3 or 4 carbon atoms, are halogen atoms, by which (in particular) chlorine or bromine atoms are understood, cyano, thiocyano, hydroxyl, mercapto, amino, alkoxy (with 1 to 4 carbon atoms), phenyl, phenoxy, acyl, acyloxy and acylamino groups. The nuclei of aromatic character may bear, besides the aforenamed substituents, e.g., nitro and alkyl groups, the latter preferably with 1 to 4 carbon atoms.

Groups of the formulae R—X— and R'—Y— are examples of suitable acyl radicals; in these formulae R stands for a hydrocarbon radical which may contain hetero atoms and/or bear further substituents, preferably an alkyl or phenyl radical which may be substituted as described above, R' for a hydrogen atom or R, X for a group of the formula —O —CO— or —SO$_2$—, Y for a group of the formula —CO—, —NR"CO— or —NR"SO$_2$— and R" for a hydrogen or R.

The preferred compounds of formula (I) are of the formula

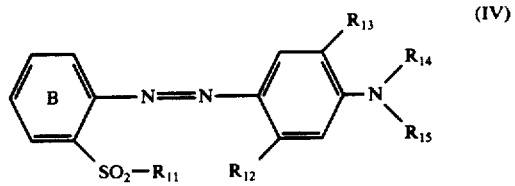

where

- $R_{11}$ stands for a lower alkyl radical which may bear a chlorine or bromine atom; a phenyl radical which may bear as substituents fluorine, chlorine, bromine or iodine atoms, hydroxyl, methyl, amino, methylamino, nitro or acetylamino groups; or a pyridyl radical;
- $R_{12}$ for a hydrogen atom or a lower alkyl radical; a formylamino radical; a lower alkylcarbonylamino radical which may be substituted by chlorine or bromine atoms, acetoxy, methoxy, ethoxy or phenoxy groups; a methoxycarbonylamino, ethoxycarbonylamino, benzoylamino, (benzamido) methylsulphonylamino or ethylsulphonylamino radical;
- $R_{13}$ for a hydrogen atom or a lower alkyl or alkoxy radical;
- $R_{14}$ for a hydrogen atom or an alkyl group with 1 to 4 carbon atoms which may bear as substituents a cyano, hydroxyl, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl group;
- $R_{15}$ for a hydrogen atom or an alkyl group with 1 to 4 carbon atoms which may bear as substituents a hydroxyl, methoxy, ethoxy, cyanoethoxy, phenoxy, phenyl, pyridyl methylpyridl, pyridylethoxy, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, phthalimide, sulphophthalimide or succinimide group, or a cationic group of one of the formulae —N+(CH$_3$)$_2$—NH$_2$, —N+(CH$_3$)$_3$, —N+(C$_2$H$_5$)$_3$,

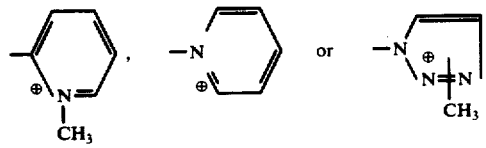

and where the nucleus B may bear as further substituents chlorine or bromine atoms, cyano, nitro, methyl, methoxy, methylsulphonyl, ethylsulphonyl, aminosulfonyl (sulfamoyl) or methylaminosulfonyl (methylsulfamoyl) groups.

Representative compounds of Formula I are those of the formulae (VII) and

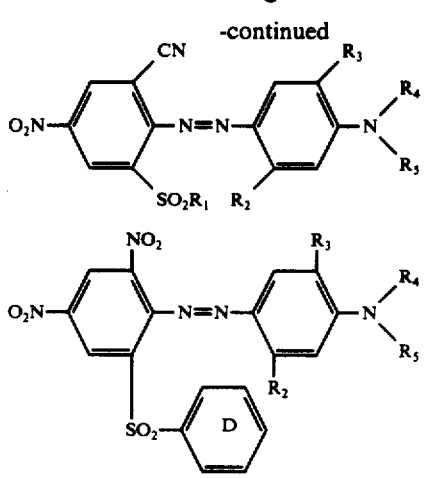

(VIII), wherein $R_1$, $R_2$, $R_3$, $R_4$ and $R_5$ are as defined above, and Ring D may bear further substituents, and particularly those of the formulae

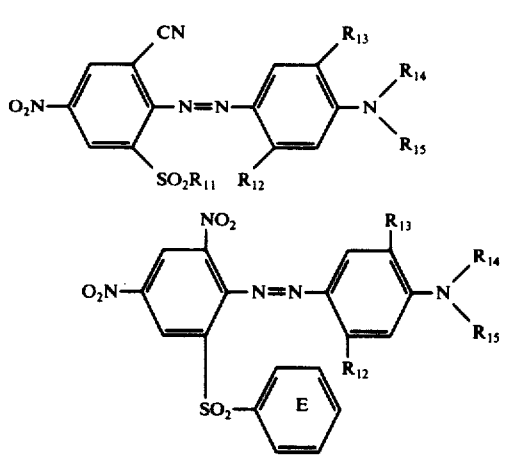

(IX) and (X), wherein $R_{11}$, $R_{12}$, $R_{13}$, $R_{14}$ and $R_{15}$ are as defined above, and Ring E may bear fluoro, chloro, bromo, iodo, hydroxy, methyl, amino, methylamino, nitro or acetamido substituents.

Alkyl and alkoxy groups denoted as "lower" bear 1 to 4 or preferably 1 or 2 carbon atoms.

The compounds of formula (IV) are obtained by condensing 1 mole of an azo compound of the formula

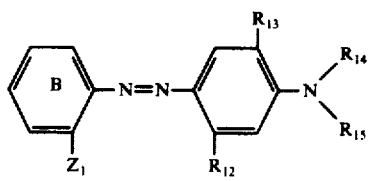

(V), where $Z_1$ represents a chlorine, bromine or iodine atom or a nitro group,
with 1 mole of a compound of the formula $$H-SO_2-R_1 \qquad (VI)$$

or a salt thereof.

The preferred salts of compounds of formulae (III) and (VI) are those of alkaline metals and alkaline-earth metals, in particular the sodium, potassium, magnesium and calcium salts.

The reaction is effected preferably in an organic sovlent, although an aqueous suspension can be used. Examples of suitable solvents are:

a. alcohols, ethers and esters, in particular amyl alcohol, glycol monomethylether, glycol monoethylether, diethylene glycol monomethylether and glycol monoethyletheracetate;

b. carboxylic acid amides, N-substituted carboxylic amides, dialkylsulphoxides and dialkylsulphones, e.g. formamide, dimethylformamide, dimethylsulphoxide, dimethylacetamide, N-methylpyrrolidone and tetramethylenesulphone;

c. other nitrogenous solvents, such as quinoline, acetonitrile, benzonitrile and phosphoric acid-tris-dimethylamide.

The halogen atoms are easier to exchange than nitro groups, so azo compounds whose diazo components are bound to a nitro group in one ortho-position to the azo group and to a halogen atom in the other ortho-position can be reacted without difficulty so as to retain the nitro group. By employing the azo compound in slight excess relatively to the compound of formula (III) or (VI), ortho-ortho'-dihalogeno-azo compounds can be readily reacted so that only one halogen atom is exchanged.

The new process according to the present invention makes possible the production of compounds which hitherto have not been known, for example, the compounds of Formulae VII, VIII, IX and X.

It is desirable to convert the new dyes thus obtained into dye preparations before application, when they are sparingly soluble in water. They are worked up as dye preparations in the normal way, e.g. by grinding in the presence of dispersion agents and/or fillers, with subsequent drying in a vacuum or atomizer drier if dry preparations are required. Upon addition of a suitable volume of water, the dye preparations can be utilized for exhaust dyeing, pad dyeing and printing from long or short baths.

From aqueous dispersion the dyes build up well on textiles made of synthetic or semi-synthetic hydrophobic organic substances of high molecular weight. They are particularly suitable for the dyeing and printing of textiles of polyester, cellulose acetate, cellulose triacetate and polyamide fibres. They are also dyeable on polyolefins.

Those dyes which contain a nitrogen atom capable of salt formation are highly suitable, especially in the form of their salts, for dyeing polyacrylonitrile fibres.

Known exhaustion dyeing, padding and printing processes are employed, for example the one described in French Pat. No. 1,445,371.

The dyeings obtained are extremely fast to thermofixation, sublimation, pleating, gas fumes, cross dyeing, rubbing, dry cleaning, chlorine, and wet treatments, such as water, washing and perspiration. They are highly stable to the action of the pre-cure and post-cure permanent press finishing processes. The dischargeability and reserve of wool and cotton are good. The light fastness is excellent, even in pale shades, so the new dyes are very suitable as components for the production of fashionable pastel shades.

In the following Examples the parts and percentages are by weight and the temperatures in degrees centigrade.

EXAMPLE 1

18 Parts of a 30% aqueous solution of sodium methanesulphinate ($H_3C$—$SO_2$—Na) are added to a solution of 23 parts of 2-bromo-4-nitro-6-cyano-2'-acetylamino-4'-diethylamino-1,1'-azobenzene in 300 parts of dimethylformamide at 20°-25°. The solution is raised to 60°-65° and stirred to 6 hours, then it is cooled to 25° and diluted with 500 parts of methanol. The dye settles out and is filtered off, washed with methanol and dried. It dyes synthetic fibres in blue shades with excellent fastness properties. In place of 2-bromo-4-nitro-6-cyano-2'-acetylamino-4'-diethylamino-1,1'-azobenzene, the equimolecular amount of 2-chloro - or 2-iodo-4-nitro-6-cyano-2'-acetylamino-4'-diethylamino-1,1'-azobenzene or 2,4-dinitro-6-cyano-2'-acetylamino-4'-diethylamino-1,1'-azobenzene and, in place of sodium methanesulphinate can be employed potassium, calcium or magnesium methanesulfinate, with equally good results.

EXAMPLE 2

A solution of 26.7 parts of sodium benzenesulphinate ($H_5C_6$—$SO_2$—Na) are added to a solution of 23 parts of 2-bromo-4-nitro-6-cyano-2'-methoxycarbonylamino-4'-N,N-diethylamino-1,1'-azobenzene in 450 parts of dimethylformamide at 60°-65°. The reaction solution is stirred for 8 hours at 60°-65° and for 2 hours at 75°-80°. It is then cooled to 0°and, after stirring for 20 minutes at this temperature, the precipitated dye is filtered off. The filter residue is washed, first with methanol and then with water, and subsequently dried. On synthetic fibres the dye thus obtained gives dyeings of blue shade with excellent fastness properties.

EXAMPLE 3

A solution of 29 parts of sodium benzenesulphinate, 70 parts of dimethylformamide and 30 parts of water is added to a solution of 57.5 parts of 2-bromo-4-nitro-6-cyano-2'-acetylamino-4'-N,N-di-$\beta$-acetoxyethylamino-1,1'-azobenzene in 350 parts of dimethylformamide at 60°-65°. The reaction solution is stirred for 8 hours at 60°-65° and then for 2 hours at 70°. On cooling to 0°, the precipitated dye is filtered off, washed with petroleum ether and then with water, and dried. The dye thus obtained dyes synthetic fibres in blue shades with excellent fastness properties.

The dyes listed in the following Table 1 correspond to the formula

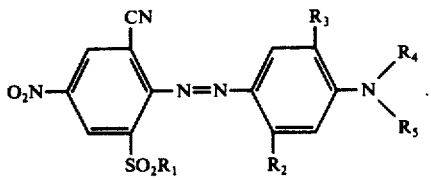

and can be produced in accordance with the procedures given in Examples 1 to 3.

Table 1

| Example No | $R_1$ | $R_2$ | $R_4$ | $R_5$ | $R_3$ | Shade on Polyester fibre |
|---|---|---|---|---|---|---|
| 4 | —CH₃ | —NHCHO | —CH₂—CH₂—OCOCH₃ | —CH₂—CH₂—OCOCH₃ | H | blue |
| 5 | " | —NHCOC₂H₅ | —CH₂—CH₂—COOCH₃ | —CH₂—CH₂—COOCH₃ | " | " |
| 6 | " | —NHCHO | —CH₂—CH₂—COOCH₃ | —CH₂—CH₂—COOCH₃ | " | " |
| 7 | " | —NHCOCH₃ | " | " | —OC₂H₅ | " |
| 8 | —C₂H₅ | —NHCOC₂H₅ | —CH₂—CH₂—OCOCH₃ | —CH₂—CH₂—OCOCH₃ | H | " |
| 9 | " | —NHCHO | " | " | " | " |
| 10 | " | " | —CH₂—CH₂—CN | —CH₂—CH₂—CN | " | " |
| 11 | —C₆H₅ | —NHCOCH₃ | —CH₂—CH₃ | —CH₂—CH₃ | " | " |
| 12 | " | —NHCHO | " | " | " | " |
| 13 | " | —CH₃ | —CH₂—CH₂—OOCH | —CH₂—CH₂—OOCH | " | " |
| 14 | " | —NHCOCH₃ | —CH₂—CH₂—OCOCH₃ | —CH₂—CH₂—OCOCH₃ | " | " |
| 15 | " | " | —CH₂—CH₂—COOCH₃ | —CH₂—CH₂—COOCH₃ | " | " |
| 16 | " | " | " | " | —OC₂H₅ | " |
| 17 | " | " | —CH₂—CH₂—OCOCH₃ | —CH₂—CH₂—OCOCH₃ | H | " |
| 18 | " | —NHCOCH₃ | —CH₂—CH₂—OCOCH₃ | —CH₂—CH₂—OCOCH₃ | H | " |
| 19 | " | —NHCOCH₃ | —CH₂—CH₂—OCOCH₃ | —CH₂—CH₂—OCOCH₃ | H | " |
| 20 | " | —NHCOCH₃ | —CH₂—CH₂—OCH₃ | —CH₂—CH₂—OCH₃ | " | " |
| 21 | " | —NHCOCH₃ | " | " | " | " |
| 22 | (2-CH₃,4-Cl-C₆H₃)— | H | —CH₂—CH₂—OCOCH₃ | —CH₂—CH₂—OCOCH₃ | H | " |
| 23 | (2-CH₃-C₆H₄)— | —NHCOCH₃ | —CH₂—CH₂—CN | —CH₂—CH₂—C₆H₅ | " | " |
| 24 | —CH₃ / —CH₂—Cl | —CH₃ / —NHCOCH₃ | —CH₂—CH₃ | —CH₂—CH₂—OH | —OCH₃ | red violet |
| 25 | —CH₂—CH₃ / —CH₂—Cl | " | " | —CH₂—CHOH—CH₂—OH | —OC₂H₅ | blue |
| 26 | " | " | " | —CH₂—CH₂—N(COCH₂—)₂ (succinimide) | " | " |
| 27 | —CH₃ | —NHCOC₂H₅ | —CH₂—CH₂—CN | —CH₂—CH₂-(4-pyridyl) / —CH₂—CH₂-(2-pyridyl) | H | " |

Table 1-continued

| Example No | R₁ | R₂ | R₄ | R₅ | R₃ | Shade on Polyester fibre |
|---|---|---|---|---|---|---|
| 28 | " | —NHCOCH₃ | " | " | —OCH₃ | " |
| 29 | " | H | —CH₂—CH₃ | —CH₂—N(pyridine with CH₃) | H | red violet |
| 30 | " | " | " | —CH₂—CH₂—N(pyridine) | H | " |
| 30 | " | —NHCOCH₃ | " | —CH₂—CH₂—N(pyridine) | —OCH₃ | blue |
| 31 | " | " | " | —CH₂—CH₂—N(phthalimide C=O, C=O) | H | " |
| 32 | " | H | —CH₂—CH₂—CN | —CH₂—CH₂—OCO—C₆H₅ | " | " |
| 33 | " | " | " | —CH₂—CH₂—COO—C₆H₅ | " | " |
| 34 | " | —NHCOCH₃ | " | —CH₂—CH₂—OCOCH₃ | " | " |
| 35 | " | —NHCHO | " | —CH₂—CH₂—N(benzosulfonimide C=O, SO₂) | H | red violet |
| 36 | " | —CH₃ | " | " | " | blue |
| 37 | —CH₃ (3-methyl-5-nitro phenyl, NO₂) | H | " | —CH₂—CH₂—OH | H | " |
| 38 | " | " | " | —CH₂—CH₂—OCOCH₃ | " | " |
| 39 | " | " | " | H | " | " |
| 40 | (2-chloro-4-nitrophenyl, Cl, NO₂) | H | " | H | H | red violet |

Table 1-continued

| Example No | $R_1$ | $R_2$ | $R_4$ | $R_5$ | $R_3$ | Shade on Polyester fibre |
|---|---|---|---|---|---|---|
| 41 | 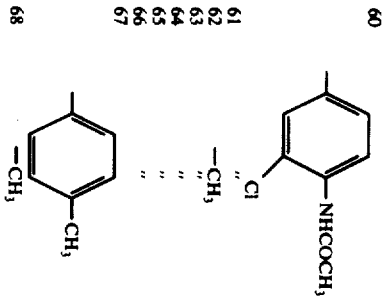 | —NHCOCH₃ | —CH₂—CH₃ | —CH₂—CH₃ | H | blue |
| 42 | " | —NHCOCH₃ | " | " | H | " |
| 43 | " | —NHCOC₂H₅ | " | " | H | " |
| 44 | " | —CH₃ | —CH₂—CH₃ | —CH₂—CH₃ | H | violet |
| 45 | 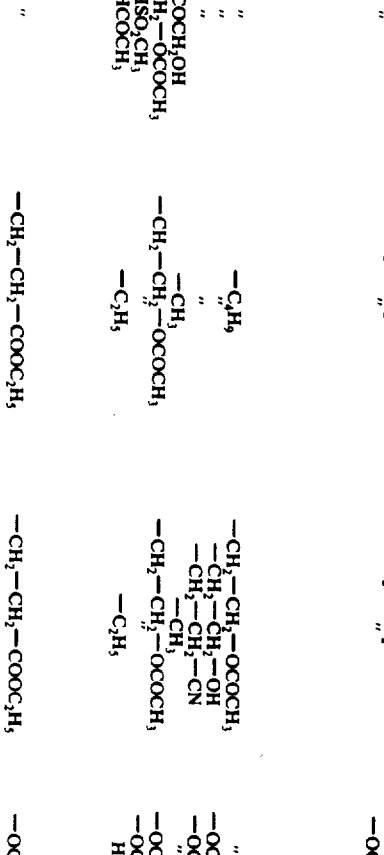 | —NHCOOCH₂—CH₃ | —CH₂—CH₂—CN | —CH₂—CH₂—OH | H | blue |
| 46 | " | —NHCOCH₂—OCH₃ | " | —CH₂—CH₂—OCOCH₃ | —OC₂H₅ | " |
| 47 | " | —NHCOC₆H₅ | " | —CH₂—CH₂—OCOCH₃ | —OCH₃ | " |
| 48 | " | —NHCOCH₃ | " | " | —OC₂H₅ | " |
| 49 | " | —NHCOC₂H₅ | " | " | —OCH₃ | " |
| 50 | " | —NHCOCH₃ | —CH₂—CH₂—OCOCH₃ | —CH₂—CH₂—OH | —OCH₃ | " |
| 51 | " | —NHCOC₂H₅ | " | —CH₂—CH₂—OCOCH₃ | —OCH₃ | " |
| 52 | " | —NHCOCH₃ | —CH₂—CH₂—OCOCH₃ | —CH₂CH₂OCH₂CH₂CN | —OC₂H₅ | " |
| 53 | " | —NHCOCH₃ | —CH₃ | —CH₂—CH₂—CH₃ | " | " |
| 54 | " | —NHCOCH₃ | " | —CH₂—CH₂—OCH₃ | —OCH₃ | " |
| 55 | " | —NHCOCH₃ | " | —CH₂—CH₂—OH | —OCH₃ | " |
| 56 | " | —NHCOCH₃ | —C₂H₅ | —CH₂—CH₂—OCOCH₃ | —OC₂H₅ | red |
| 57 | " | H | " | —CH₂—CH₂—OCOC₆H₅ | H | blue |
| 58 | " | —NHCOCH₃ | —CH₂—CH₂—OCHO | —CH₂—CH₂—OCOC₆H₅ | —OCH₃ | " |
| 59 | " | " | " | " | —OC₂H₅ | " |
| 60 | " | " | " | —CH₂—CH₂—OCHO | —OCH₃ | " |
| 61 | 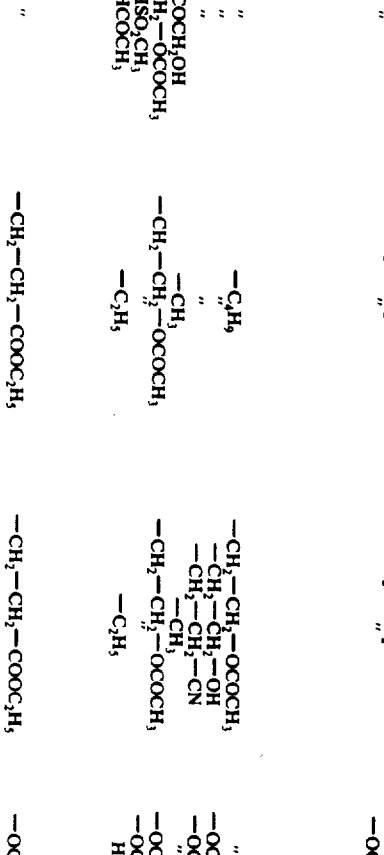 | —NHCOCH₃ | —C₄H₉ | —CH₂—CH₂—OCOCH₃ | —OC₂H₅ | " |
| 62 | " | —NHCOCH₃ | " | —CH₃ | —OCH₃ | " |
| 63 | " | —NHCOCH₂OH | —CH₃ | —CH₂—CH₂—CN | —OCH₃ | " |
| 64 | " | —NHSO₂CH₃ | —CH₂—CH₂—OCOCH₃ | —CH₂—CH₂—OCOCH₃ | —OCH₃ | " |
| 65 | " | —OCOCH₃ | " | —CH₃ | H | " |
| 66 | " | —NHCOCH₃ | —C₂H₅ | —C₂H₅ | —OCH₃ | " |
| 67 | " | —NHCOCH₃ | " | " | —OCH₃ | " |
| 68 | —CH₃⌬CH₃ | " | —CH₂—CH₂—COOC₂H₅ | —CH₂—CH₂—COOC₂H₅ | —OCH₃ | " |

Table 1-continued

| Example No | R₁ | R₂ | R₄ | R₅ | R₃ | Shade on Polyester fibre |
|---|---|---|---|---|---|---|
| 69 | " | H | —CH₂—CH₃ | —CH₂—CH₂—N(CH₃)(C₂H₅) | H | red violet |
| 70 | " | H | —CH₃ | —CH₂—CH₂—N(C₂H₅)(CH₃) | H | violet |
| 71, 72 | " | —NHCOCH₃ H | —CH₂—CH₂—C₂H₅ | —CH₂CH₂COOCH₂CH₂OCH₃, —CH₂—CH₂—OCOC₂H₅ | H | red violet, blue |
| 73 | —CH₃ (pyridyl) | " | —C₂H₅ | —CH₂OCH₂CH₂— | —OC₂H₅ | " |
| 74, 75, 76, 77, 78 | " | " | —CH₂—CH₂—OCOCH₃ (—CH₃, —C₂H₅, —C₆H₅) | —CH₂—C₄H₄—C₆H₅ (—CH₃, —C₂H₅, —C₆H₅) (2-pyridyl) | —CH₃ H | " |
| 79, 80, 81 | —C₆H₄—CH₃ | —NHCOOCH₃ | " | " | H | " |
| 82, 83, 84 | —C₆H₄—CH₃ | —NHCOOCH₃ | " | " | H | " |
| 85, 86, 87, 88 | —C₆H₄—CH₃ (—CH₃, —C₂H₅, —C₆H₅) | —NHCOOCH₃, —NHCOC₂H₅ | —CH₂—CH₂—OCOCH₃ | —CH₂—CH₂—OCOCH₃ | H H | " |
| 89, 90 | —C₆H₄—CH₃ (—CH₃, —C₆H₅) | —NHCOOCH₃ | " | " | H H | " |

Table 1-continued

| Example No | R$_1$ | R$_2$ | R$_4$ | R$_5$ | R$_3$ | Shade on Polyester fibre |
|---|---|---|---|---|---|---|
| 91 | 4-CH$_3$-C$_6$H$_4$ | —NHCOCH$_3$ | —CH$_2$—CH$_2$—OCOC$_2$H$_5$ | —CH$_2$—CH$_2$—OCOC$_2$H$_5$ | H | red violet |
| 92 | " | —NHCOC$_2$H$_5$ | " | " | H | " |
| 93 | " | " | " | " | H | " |
| 94 | " | " | " | " | H | " |
| 95 | 4-CH$_3$-C$_6$H$_4$ | —NHCOOC$_2$H$_5$ | —CH$_2$—CH$_2$—OCOCH$_3$ | —CH$_2$—CH$_2$—OCOCH$_3$ | H | " |
| 96 | " | " | " | " | H | " |
| 97 | " | " | " | " | H | " |
| 98 | 4-CH$_3$-C$_6$H$_4$ | H / —NHCOCH$_3$ | —C$_2$H$_5$ | —CH$_2$—CH$_2$—OC$_2$H$_5$ | H | " |
| 99 | " | " | " | " | H | " |
| 100 | " | " | " | " | H | " |
| 101 | 4-CH$_3$-C$_6$H$_4$ | " | —CH$_2$—CH$_2$—OCH$_3$ | —CH$_2$—CH$_2$—OCH$_3$ | H | " |
| 102 | " | " | " | " | H | " |
| 103 | 4-CH$_3$-C$_6$H$_4$ | " | —CH$_2$—CH$_2$—CN | | H | " |
| 104 | " | " | " | | H | " |
| 105 | " | " | " | | H | " |
| 106 | 4-CH$_3$-C$_6$H$_4$ | —NHCOC$_2$H$_5$ | —C$_2$H$_5$ | H | H | blue |
| 107 | " | —NHCOCH$_2$OCH$_3$ | " | " | H | " |
| 108 | " | —NHSO$_2$CH$_3$ | " | " | H | " |
| 109 | 4-CH$_3$-C$_6$H$_4$ | —NHCOCH$_2$OC$_6$H$_5$ | " | " | H | " |
| 110 | " | —NHCOCH$_2$CH$_2$OCH$_3$ | " | " | H | " |
| 111 | " | —NHCOCH$_2$OC$_2$H$_5$ | " | " | H | " |
| 112 | " | —NHSO$_2$C$_2$H$_5$ | " | " | H | " |

Table 1-continued

| Example No | R₁ | R₂ | R₄ | R₅ | R₃ | Shade on Polyester fibre |
|---|---|---|---|---|---|---|
| 113 | —C₆H₅ | —NHCOCH₃ | —CH₂—CH₂—CN | —C₃H₇ | H | violet |
| 114 | " | " | " | —CH₂—C₆H₅ | H | " |
| 115 | " | " | " | —CH₂CH₂OCH₂CH₂OCOC₆H₅ | H | " |
| 116 | ![tolyl-CH₃] | " | —C₂H₅ | —CH₂—CH₂—OCOC₂H₅ | H | " |
| 117 | " | " | —CH₂—CH₂—OCOC₂H₅ | —CH₂—CH₂—OCOC₂H₅ | H | " |
| 118 | " | " | H | —CH₂—CH₂—OCH₃ | H | blue |
| 119 | " | " | " | —CH₂—CH₂—COCH₃ | H | " |
| 120 | ![tolyl-CH₃] | " | " | —CH₂—CH₂—OCH₂—CH₂—CN | H | " |
| 121 | ![4-Br-phenyl] | " | " | —CH₂CH₂OCH₂CH₂OCOC₆H₅ | H | " |
| 122 | " | " | —CH₂Br | —C₂H₅ | H | " |
| 123 | " | " | —CH₂CH₂OH | " | H | " |
| 124 | " | " | —CH₂—CH₂—OCOCH₃ | —CH₂—CH₂—OCOCH₃ | H | " |
| 125 | ![4-I-phenyl] | " | " | " | H | " |
| 126 | ![4-F-phenyl] | " | —C₂H₅ | " | H | " |
| 127 | ![4-NO₂-2-CH₃-phenyl-OH] | —NHCOOCH₃ | " | " | H | " |
| 128 | ![2-Cl-5-CH₃-phenyl-NHCH₃] | " | " | " | H | " |

Table 1-continued
| Example No | R₁ | R₂ | R₄ | R₅ | R₃ | Shade on Polyester fibre |
|---|---|---|---|---|---|---|
| 129 | 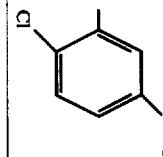 | " | " | " | H | " |

The following Table 2 gives details of further dyes of the formula
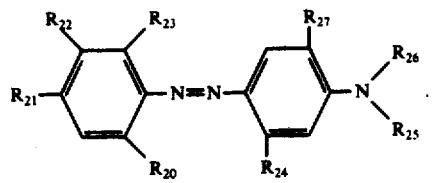
which can be produced by the process of this invention.

| Example No. | R₂₀ | R₂₁ | R₂₂ | R₂₃ | R₂₄ | R₂₅ | R₂₆ | R₂₇ | Shade on Polyester fibre |
|---|---|---|---|---|---|---|---|---|---|
| 130 | —SO₂CH₃ | Br | H | Br | H | —C₂H₅ | —C₂H₅ | H | red violet |
| 131 | " | Cl | H | Br | H | —CH₂CH₂COOCH₃ | —CH₂CH₂COOCH₃ | H | blue violet |
| 132 | " | H | H | —CH₃ | H | —CH₂CH₂OCOCH₃ | —C₂H₅ | H | red |
| 133 | " | —CH₃ | H | H | —NHCOCH₃ | —CH₂CH₂OCOCH₃ | —CH₂CH₂OCOCH₃ | H | orange |
| 134 | " | H | H | H | —NHCOCH₃ | —C₂H₅ | —C₂H₅ | H | red orange |
| 135 | " | H | Cl | Cl | H | —CH₂CH₂OH | —CH₂CH₂OH | H | red |
| 136 | " | Cl | Cl | Cl | —CH₃ | —C₂H₅ | —C₂H₅ | H | yellowish red |
| 137 | " | Cl | H | Cl | —NHCOCH₃ | —CH₂CH₂CN | —C₂H₅ | H | red |
| 138 | " | Cl | Cl | —SO₂CH₃ | H | —C₂H₅ | —C₂H₅ | H | red violet |
| 139 | " | Cl | H | H | —NHCOCH₃ | —CH₂CH₂CN | —CH₂CH₂OH | H | orange |
| 140 | " | Cl | H | Cl | H | —CH₂CH₂OCOCH₃ | —C₂H₅ | H | red violet |
| 141 | " | Cl | H | H | —NHCOC₂H₅ | —C₂H₅ | —C₂H₅ | H | orange |
| 142 | " | Br | H | —SO₂CH₃ | H | —C₂H₅ | —C₂H₅ | H | red orange |
| 143 | " | H | Cl | H | —NHCOCH₃ | " | " | H | " |
| 144 | " | —CH₃ | H | H | H | " | " | H | " |
| 145 | 3-pyridyl-SO₂— | H | H | H | H | —C₂H₅ | —C₂H₅ | H | violet |
| 146 | 2,5-dichlorophenyl | Cl | H | —CH₃ | —NHCOCH₃ | " | " | H | orange |
| 147 | " | —CH₃ | H | —SO₂CH₃ | H | " | " | H | red |
| 148 | " | Cl | H | H | H | " | " | H | red orange |
| 149 | " | H | H | —NO₂ | H | " | " | H | red orange |
| 150 | 2,4,5-trichlorophenyl-SO₂— | —CH₃ | —CH₃ | —CH₃ | —NHCOCH₃ | —CH₂CH₂OCOCH₃ | —CH₂CH₂OCOCH₃ | H | red |
| 151 | " | Cl | H | —SO₂CH₃ | H | | | H | red orange |
| 152 | " | Cl | —CH₃ | —CH₃ | —NHCOCH₃ | | | H | " |
| 153 | " | H | H | —CH₃ | " | | | H | " |
| 154 | 2-Cl-4-NHCOCH₃-phenyl | —OCH₃ | H | —OCH₃ | " | | | H | orange |
| 155 | 2-SO₂C₂H₅-4-SO₂CH₃-phenyl | —CH₃ | H | —Br | —NHCOCH₃ | | | H | red |
| 156 | " | —NO₂ | H | H | " | | | H | red |
| 157 | " | —CH₃ | H | —SO₂CH₃ | H | —CH₂CH₂CN | —CH₂CH₂CN | H | red |
| 158 | 2-NO₂-4-NO₂-phenyl | | | | | | —CH₂CH₂OH | H | red |

-continued

| Example No. | R20 | R21 | R22 | R23 | R24 | R25 | R26 | R27 | Shade on Polyester fibre |
|---|---|---|---|---|---|---|---|---|---|
| 159 | (2-Cl, 4-NO₂-phenyl) | —SO₂CH₃ | H | Cl | —NHCOCH₃ | —C₂H₅ | —C₂H₅ | H | violet |
| 160 | " | " | " | " | " | —CH₂CH₂COOCH₃ | —CH₂CH₂COOCH₃ | H | " |
| 161 | " | " | " | " | " | —CH₃ | —CH₃ | H | red violet |
| 162 | " | " | " | " | " | —C₂H₅ | —C₂H₅ | H | red |
| 163 | " | " | " | " | " | " | " | H | blue violet |
| 164 | " | " | " | " | " | " | " | H | red |
| 165 | " | " | " | " | " | " | " | H | red orange |
| 166 | (4-Cl-phenyl) —SO₂ | —CN | H | H | —NHCOCH₃ | —CH₂CH₂OH | —CH₂CH₂OH | H | red |
| 167 | (2-Cl-3-CH₃-phenyl) —SO₂ | —CF₃ | H | H | " | " | " | H | " |
|  |  | —CN | —SO₂CH₃ | —CF₃ | H | " | " | H |  |
|  |  | " | H | Br | H | " | " | H |  |
|  |  | " | Cl | H | " | " | " | H |  |
|  |  | " | H | H | —NHCOCH₃ | —CH₂CH₂OH | —CH₂CH₂OH | —OCH₃ | violet |
|  |  | —NO₂ | H | —CH₃ | " | —CH₂CH₂COOCH₃ | —CH₂CH₂COOCH₃ | H | blue violet |
|  |  | —CN | H | —NO₂ | " | —CH₂CH₂CN | —CH₃ | H | blue |
|  |  |  | H | —CN | " | —CH₂CH₂COOCH₃ | —CH₂CH₂COOCH₃ | —OCH₃ | blue violet |
| 168 | —SO₂CH₃ (4-CH₃-phenyl) | —NHCOCH₃ | H | —CH₃ | —NHCOCH₃ | H | —CH₂CH₂OH | H | red |
| 169 | —SO₂C₂H₅ | —CN | Cl | H | H | —C₂H₅ | —C₂H₅ | —OCH₃ | reddish blue |
| 170 | —SO₂CH₃ | —NHCOCH₃ | —SO₂CH₃ | Cl | H | —CH₃ | —CH₃ | H | red |
| 171 | —SO₂CH₃ | H | H | —CN | —CH₃ | —C₃H₇ | —C₂H₅ | H | violet |
| 172 | —SO₂C₂H₅ | —NHCOCH₃ | Cl | —SO₂CH₃ | H | —CH₂CH₂OH | —CH₂CH₂OH | —CH₃ | red violet |
| 173 | —SO₂CH₃ | —NHCOC₂H₅ | H | —CH₃ | —NHCOCH₃ | —C₂H₅ | —C₂H₅ | H | " |
| 174 | —SO₂C₂H₅ | —NHCOCH₃ | H | —NO₂ | " | —CH₂CH₂OCOCH₃ | —CH₂CH₂OCOCH₃ | H | " |
| 175 |  | " | Cl | Cl | " | " | " | H | " |
| 176 | —NO₂ | —SO₂CH₃ | H | H | " | —CH₃ | —C₂H₅ | —OC₂H₅ | " |
| 177 |  | —SO₂CH₃ | H | H | " | —CH₃ | —C₂H₅ | —OC₂H₅ | " |
| 178 |  | " | " | " | " | " | " | —OCH₃ | " |
| 179 |  | " | " | " | " | " | " | —OC₂H₅ | " |
| 180 |  | " | " | " | " | " | " | " | " |
| 181 |  | " | " | " | " | " | " | " | " |
| 182 |  | " | " | " | " | " | " | " | " |
| 183 |  | " | " | " | " | " | " | " | " |
| 184 |  | " | " | " | " | " | " | " | " |
| 185 |  | " | " | " | " | " | " | " | " |
| 186 |  | " | " | " | " | " | " | " | " |
| 187 |  | " | " | " | " | —CH₂CH₂OCOC₂H₅ | —CH₂CH₂OCOC₂H₅ | " | " |

-continued

| Example No. | R$_{20}$ | R$_{21}$ | R$_{22}$ | R$_{23}$ | R$_{24}$ | R$_{25}$ | R$_{26}$ | R$_{27}$ | Shade on Polyester fibre |
|---|---|---|---|---|---|---|---|---|---|
| 188 | —SO$_2$CH$_3$ | " | " | " | —NHCHO | —CH$_2$CH$_2$OCOCH$_3$ | —CH$_2$CH$_2$OCOCH$_3$ | —OCH$_3$ | " |
| 189 | " | " | " | " | —NHCOC$_2$H$_5$ | —CH$_2$CH$_2$OCOC$_2$H$_5$ | —CH$_2$CH$_2$OCOC$_2$H$_5$ | —OC$_2$H$_5$ | " |
| 190 | " | " | " | " | —NHCOCH$_3$ | —CH$_2$CH$_2$CN | —CH$_2$CH$_2$OCOCH$_3$ | H | " |
| 191 | " | " | " | " | —NHCOCH$_3$ | —CH$_2$CH$_2$OCOCH$_3$ | —CH$_2$CH$_2$OCOCH$_3$ | —OC$_2$H$_5$ | " |
| 192 | " | " | " | " | —NHCOCH$_3$ | —CH$_2$CH$_2$OCOCH$_3$ | —CH$_2$CH$_2$OCOCH$_3$ | —OC$_2$H$_5$ | " |
| 193 | " | " | " | " | —NHCOCH$_3$ | —CH$_2$CH$_2$OCOC$_2$H$_5$ | —CH$_2$CH$_2$OCOC$_2$H$_5$ | H | " |
| 194 | " | " | " | " | —NHCOCH$_3$ | —CH$_2$CH$_2$OCOOCH$_3$ | —CH$_2$CH$_2$OCOOCH$_3$ | —OC$_2$H$_5$ | " |
| 195 | " | " | " | " | —NHCOCH$_3$ | —CH$_2$CH$_2$CHO | —CH$_2$CH$_2$OCHO | H | " |
| 196 | " | " | " | " | —NHCOCH$_3$ | —CH$_2$CH$_2$OCOCH$_3$ | —CH$_2$CH$_2$OCOCH$_3$ | —OCH$_3$ | " |
| 197 | —SO$_2$C$_6$H$_5$ | " | " | " | —NHCOCH$_3$ | —CH$_2$CH$_2$OCOCH$_3$ | —CH$_2$CH$_2$OCOCH$_3$ | —OCH$_3$ | " |
| 198 | —SO$_2$—⟨C$_6$H$_3$(CH$_3$)⟩ | " | " | " | —NHCOCH$_3$ | —CH$_2$CH$_2$OCOCH$_3$ | —CH$_2$CH$_2$OCOCH$_3$ | —OC$_2$H$_5$ | " |
| 199 | —SO$_2$—⟨C$_6$H$_3$(CH$_3$)⟩ | " | H | " | " | " | " | " | " |
| 200 | —SO$_2$—⟨C$_6$H$_3$(CH$_3$)⟩ | " | H | " | " | " | " | " | " |
| 201 | —SO$_2$—⟨C$_6$H$_3$(CH$_3$)⟩ | " | H | " | —NHCOC$_2$H$_5$ | —CH$_2$CH$_2$OCOC$_2$H$_5$ | —CH$_2$CH$_2$OCOC$_2$H$_5$ | —OC$_2$H$_5$ | " |
| 202 | —SO$_2$—⟨C$_6$H$_3$(CH$_3$)⟩ | " | H | " | —CH$_2$CH$_2$OCOC$_2$H$_5$ | " | —OCH$_3$ | " |
| 203 | —SO$_2$C$_6$H$_5$—⟨C$_6$H$_3$(CH$_3$)⟩ | " | H | " | —NHCOC$_2$H$_5$ | —CH$_2$CH$_2$OCOC$_2$H$_5$ | —CH$_2$CH$_2$OCOC$_2$H$_5$ | —OC$_2$H$_5$ | " |
| 204 | —SO$_2$C$_6$H$_5$—⟨C$_6$H$_3$(CH$_3$)⟩ | " | H | " | —NHCHO | —CH$_2$CH$_2$OCOCH$_3$ | —CH$_2$CH$_2$OCOCH$_3$ | —OC$_2$H$_5$ | " |
| 205 | —SO$_2$C$_6$H$_5$—⟨C$_6$H$_3$(CH$_3$)⟩ | " | H | " | —NHCOCH$_3$ | —CH$_2$CH$_2$OCOCH$_3$ | —CH$_2$CH$_2$OCOCH$_3$ | —OC$_2$H$_5$ | " |
| 206 | —SO$_2$—⟨SO$_2$C$_6$H$_5$-C$_6$H$_3$(CH$_3$)⟩ | " | H | " | " | " | " | " | " |
| 207 | —SO$_2$—⟨C$_6$H$_4$(CH$_3$)⟩ | " | H | " | " | —CH$_2$CH$_2$CN | —CH$_2$CH$_2$OCOCH$_3$ | —OC$_2$H$_5$ | " |
| 208 | —SO$_2$—⟨C$_6$H$_4$(CH$_3$)⟩ | " | H | " | " | —CH$_2$CH$_2$OCOCH$_3$ | —CH$_2$CH$_2$OCOOCH$_3$ | " | " |
| 209 | —SO$_2$—⟨C$_6$H$_4$(CH$_3$)⟩ | " | H | " | " | —CH$_2$CH$_2$OCHO | —CH$_2$CH$_2$OCHO | " | " |

EXAMPLE 210

18 Parts of a 30% aqueous solution of sodium methanesulphinate are added to a solution of 21.3 parts of [2-chloro-4-nitro-4′N-ethyl-N-β-trimethylammoniumethylamino -1,1′-azobenzene]$^\oplus$ C$^\ominus$ in 300 parts of dimethylformamide at 20°-25°. The temperature of the reaction solution is increased to 80°-90° and it is stirred for 6 hours. Subsequently it is cooled to 25° and run into ice-water. The dye is precipitated by the addition of common salt, filtered off and washed with concentrated common salt solution. The dye thus produced gives dyeings of rubine shade on polyacrylonitrile fibres which have excellent fastness properties.

The basic dyes detailed in the following Table 3 are of the formula

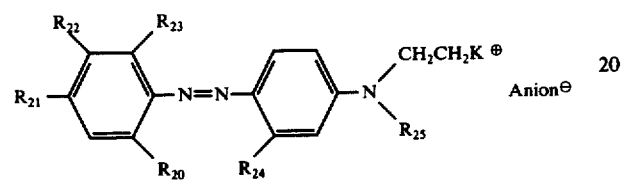

and can be produced in comformity with the foregoing Example.

EXAMPLE 1

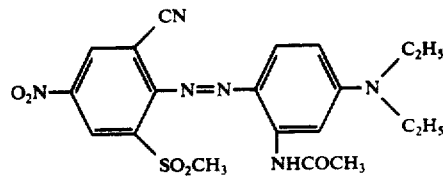

EXAMPLE 13

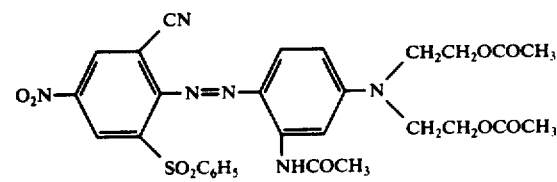

| Example No | $R_{20}$ | $R_{21}$ | $R_{22}$ | $R_{23}$ | $R_{24}$ | $R_{25}$ | K | Shade on Polyester fibre |
|---|---|---|---|---|---|---|---|---|
| 211 | —SO$_2$CH$_3$ | —SO$_2$CH$_3$ | H | H | H | —C$_2$H$_5$ | NH$_2$<br>\|<br>—N(CH$_3$)$_2$ | scarlet |
| 212 | " | —SO$_2$N(CH$_3$)$_2$ | Cl | H | H | " | —N(CH$_3$)$_3$ | " |
| 213 | | —NO$_2$ | H | —NO$_2$ | —CH$_3$ | —C$_2$H$_5$ | " | blue violet |
| | —SO$_2$-⟨cyclohexyl⟩-CH$_3$ | | | | | | | |
| 214 | —SO$_2$CH$_3$ | " | H | " | " | " | NH$_2$<br>\|<br>—N(CH$_3$)$_2$ | " |
| 215 | " | Cl | H | " | H | —CH$_3$ | —N⟨pyridyl⟩ | red violet |
| 216 | " | H | Cl | H | H | —C$_2$H$_5$ | —N⟨methylpyridyl⟩ | orange |
| 217 | " | H | —SO$_2$CH$_3$ | H | H | " | —N⟨methyltriazolyl⟩ | " |
| 218 | " | —NO$_2$ | H | —NO$_2$ | —NHCOC$_6$H$_5$ | " | —N(CH$_3$)$_3$ | blue |
| 219 | " | " | H | H | H | " | —N(C$_2$H$_5$)$_3$ | rubine |
| 220 | | H | H | —NO$_2$ | H | —CH$_3$ | —N(CH$_3$)$_2$<br>\|<br>NH$_2$ | bluish red |
| | —SO$_2$-⟨cyclohexyl⟩-CH$_3$ | | | | | | | |
| 221 | —SO$_2$C$_2$H$_5$ | —NO$_2$ | H | H | —CH$_3$ | —C$_2$H$_5$ | —N⟨pyridyl⟩ | bordeaux |

Representative dyestuffs of the foregoing Examples are as follows:

EXAMPLE 67

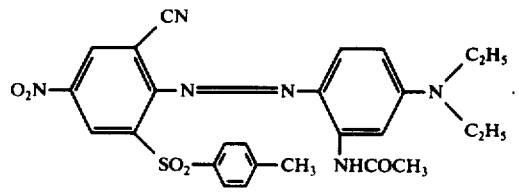

EXAMPLE 80

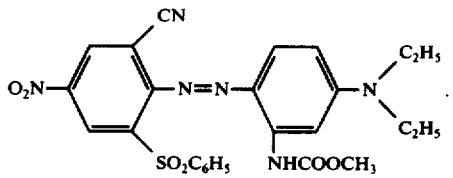

EXAMPLE 85

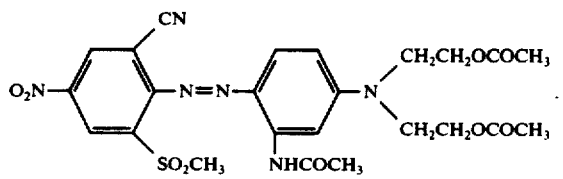

EXAMPLE 86

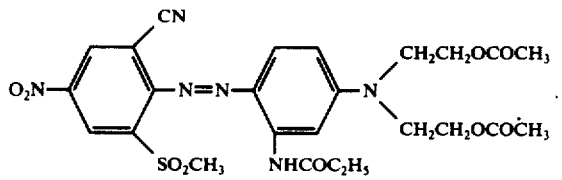

Having thus disclosed the invention what we claim is:
1. A compound of the formula

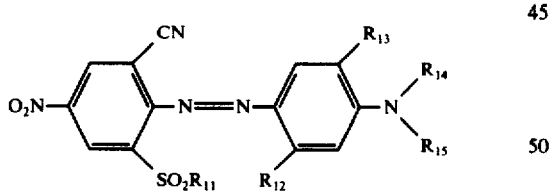

wherein $R_{11}$ is phenyl or substituted phenyl, wherein each substituent of substituted phenyl is independently fluoro, chloro, bromo, iodo, hydroxy, methyl, amino, methylamino, nitro or acetamido, $R_{12}$ is hydrogen, lower alkyl, formamido, lower alkylcarbonylamino, substituted lower alkylcarbonylamino, methoxycarbonylamino, ethoxycarbonylamino, benzamido, methylsulfonylamino or ethylsulfonylamino, wherein the substituent of substituted lower alkylcarbonylamino is chloro, bromo, acetoxy, methoxy, ethoxy or phenoxy, $R_{13}$ is hydrogen, lower alkyl or lower alkoxy, $R_{14}$ is hydrogen, lower alkyl or substituted lower alkyl wherein the substituent is cyano, hydroxy, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl, and $R_{15}$ is hydrogen, lower alkyl or substituted lower alkyl wherein the substituent is hydroxy, methoxy, ethoxy, cyanoethoxy, phenoxy, phenyl, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, 1,1-dimethylhydrazinium $A^-$, trimethylammonium $A^-$, or triethylammonium $A^-$, wherein $A^-$ is an anion.

2. A compound according to claim 1
wherein $R_{12}$ is hydrogen, lower alkyl, formamido, lower alkylcarbonylamino, substituted lower alkylcarbonylamino, methoxycarbonylamino, ethoxycarbonylamino, methylsulfonylamino or ethylsulfonylamino, wherein the substituent of substituted lower alkylcarbonylamino is methoxy or ethoxy, $R_{13}$ is hydrogen or lower alkoxy, $R_{14}$ is lower alkyl or substituted lower alkyl wherein the substituent is cyano, methoxy, formyloxy, acetoxy, propionyloxy or methoxycarbonyl, and $R_{15}$ is hydrogen, lower alkyl or substituted lower alkyl wherein the substituent is hydroxy, methoxy, cyanoethoxy, phenoxy, phenyl, formyloxy, acetoxy, propionyloxy or methoxycarbonyl.

3. A compound according to claim 2
wherein $R_{11}$ is phenyl, 4-bromophenyl, 4-fluorophenyl, 4-iodophenyl, 2-methylphenyl, 4-methylphenyl, 3-nitrophenyl, 4-acetamido-3-chlorophenyl, 3-amino-6-chlorophenyl, 4-chloro-3-methylphenyl, 4-chloro-3-methylaminophenyl, 2-chloro-4-nitrophenyl, 4-chloro-3-nitrophenyl, 3,4-dichlorophenyl, 2-hydroxy-5-nitrophenyl or 2-methyl-5-nitrophenyl, $R_{12}$ is hydrogen, methyl, ethyl, formamido, acetamido, propionamido, methoxyacetamido, methoxypropionamido, ethoxypropionamido, methoxycarbonylamino, ethoxycarbonylamino, methylsulfonylamino or ethylsulfonylamino, $R_{13}$ is hydrogen, methoxy or ethoxy, $R_{14}$ is ethyl, butyl or β-substituted ethyl wherein the substituent is cyano, methoxy, formyloxy, acetoxy, propionyloxy or methoxycarbonyl, and $R_{15}$ is hydrogen, ethyl, propyl, benzyl or β-substituted ethyl wherein the substituent is hydroxy, methoxy, 2-cyanoethoxy, phenoxy, phenyl, formyloxy, acetoxy, propionyloxy or methoxycarbonyl.

4. A compound according to claim 1 having the formula

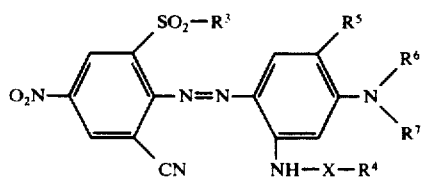

wherein $R^3$ is phenyl or phenyl substituted by methyl, fluoro, chloro, bromo, iodo, nitro or acetamido, $R^4$ is lower alkyl, lower alkyl substituted by chloro, bromo, methoxy, ethoxy or acetoxy or phenyl, with the proviso that $R^4$ is methyl or ethyl when X is —COO— or —SO$_2$—, $R^5$ is hydrogen, lower alkyl or lower alkoxy, $R^6$ is lower alkyl or lower akyl substituted by hydroxy, cyano, methoxy, ethoxy, cyanoethoxy, phenyl, methoxycarbonyl, ethoxycarbonyl, methoxycarbonyloxy, ethoxycarbonyloxy, acetoxy or propionyloxy, $R^7$ is hydrogen, lower alkyl or lower alkyl substituted by hydroxy, methoxy, ethoxy, cyanoethoxy, phenyl, phenoxy, methoxycarbonyl, ethoxycarbonyl, methoxyethoxycarbonyl, phenoxycarbonyl, methoxycarbonyloxy, ethoxycarbonyloxy, phenoxycarbonyloxy, acetoxy, propionyloxy or benzoyloxy, and X is —CO—, —COO— or —SO$_2$—.

5. A compound according to claim 4 having the formula

wherein
$R^3$ is phenyl or tolyl,
Y is lower alkanoyl, methoxycarbonyl or ethoxycarbonyl,
$R^5$ is hydrogen, methyl, methoxy or ethoxy,
$R^6$ is lower alkyl or lower alkyl substituted by hydroxy, methoxy, ethoxy, acetoxy, propionyloxy, cyano or phenyl, and
$R^7$ is hydrogen, lower alkyl or lower alkyl substituted by hydroxy, acetoxy, propionyloxy, methoxy or ethoxy.

6. The compound according to claim 5 having the formula

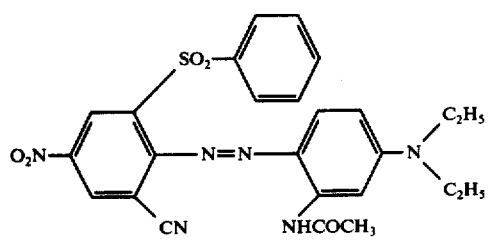

7. The compound according to claim 5 having the formula

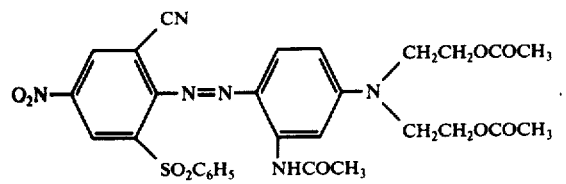

8. The compound according to claim 5 having the formula

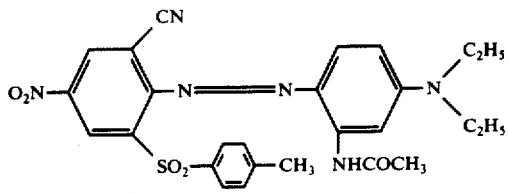

9. The compound according to claim 5 having the formula

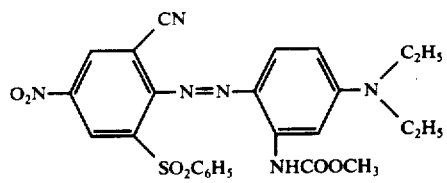

10. A compound of the formula

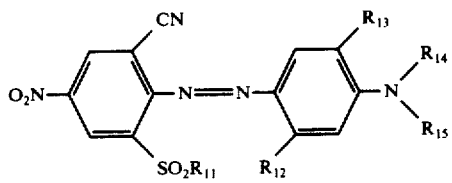

wherein
$R_{11}$ is lower alkyl, substituted lower alkyl, phenyl or substituted phenyl, wherein the substituent of substituted lower alkyl is chloro or bromo and each substituent of substituted phenyl is independently fluoro, chloro, bromo, iodo, hydroxy, methyl, amino, methylamino, nitro or acetamido, $R_{12}$ is hydrogen, lower alkyl, formamido, substituted lower alkylcarbonylamino, methoxycarbonylamino, ethoxycarbonylamino, benzamido, methylsulfonylamino or ethylsulfonylamino, wherein the substituent of substituted lower alkylcarbonylamino is chloro, bromo, acetoxy, methoxy, ethoxy or phenoxy, $R_{13}$ is hydrogen, lower alkyl or lower alkoxy, $R_{14}$ is hydrogen, lower alkyl or substituted lower alkyl wherein the substituent is cyano, hydroxy, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl, and $R_{15}$ is hydrogen, lower akyl or substituted lower alkyl wherein the substituent is hydroxy, methoxy, ethoxy, cyanoethoxy, phenoxy, phenyl, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, 1,1-dimethylhydrazinium A$^-$, trimethylammonium A$^-$, or triethylammonium A$^-$, wherein A$^-$ is an anion.

11. A compound according to claim 10
wherein
$R_{11}$ is lower alkyl, phenyl or substituted phenyl, wherein each substituent of substituted phenyl is independently fluoro, chloro, hydroxy, methyl, amino, methylamino or nitro, $R_{13}$ is hydrogen or lower alkoxy, R₁₄ is lower alkyl or substituted lower alkyl wherein the substituent is cyano, acetoxy, methoxycarbonyl or methoxycarbonyloxy, and R₁₅ is hydrogen, lower alkyl or substituted lower alkyl wherein the substituent is hydroxy, phenoxy, acetoxy, benzoyloxy, methoxycarbonyl, phenoxycarbonyl, methoxycarbonyloxy, phenoxycarbonyloxy or methoxyethoxycarbonyl.

12. A compound according to claim 11 wherein

R₁₁ is methyl, phenyl, 4-fluorophenyl, 4-methylphenyl, 3-nitrophenyl, 3-amino-6-chlorophenyl, 4-chloro-3-methylaminophenyl, 2-chloro-4-nitrophenyl, 3,4-dichlorophenyl, 2-hydroxy-5-nitrophenyl or 2-methyl-5-nitrophenyl, R₁₂ is hydrogen, methyl, ethyl, formamido, methoxyacetamido, ethoxyacetamido, phenoxyacetamido, acetoxyacetamido, methoxypropionamido, ethoxypropionamido, methoxycarbonylamino, ethoxycarbonylamino, benzamido, methylsulfonylamino or ethylsulfonylamino, R₁₃ is hydrogen, methoxy or ethoxy, R₁₄ is ethyl, butyl or β-substituted ethyl wherein the substituent is cyano, acetoxy, methoxycarbonyl or methoxycarbonyloxy, and R₁₅ is hydrogen, ethyl or β-substituted ethyl wherein the substituent is hydroxy, phenoxy, acetoxy, benzoyloxy, methoxycarbonyl, phenoxycarbonyl, methoxycarbonyloxy, phenoxycarbonyloxy or methoxyethoxycarbonyl.

13. A compound of the formula

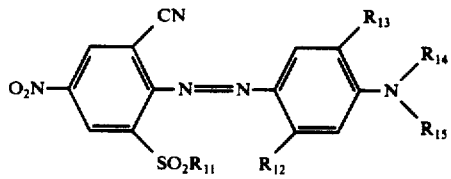

wherein

R₁₁ is lower alkyl, substituted lower alkyl, phenyl or substituted phenyl, wherein the substituent of substituted lower alkyl is chloro or bromo and each substituent of substituted phenyl is independently fluoro, chloro, bromo, iodo, hydroxy, methyl, amino, methylamino, nitro or acetamido, R₁₂ is hydrogen, lower alkyl, formamido, lower alkylcarbonylamino, substituted lower alkylcarbonylamino, methoxycarbonylamino, ethoxycarbonylamino, benzamido, methylsulfonylamino or ethylsulfonylamino, wherein the substituent of substituted lower alkylcarbonylamino is chloro, bromo, acetoxy, methoxy, ethoxy or phenoxy, R₁₃ is lower alkyl or lower alkoxy, R₁₄ is hydrogen, lower alkyl or substituted lower alkyl wherein the substituent is cyano, hydroxy, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl, and R₁₅ is hydrogen, lower alkyl or substituted lower alkyl wherein the substituent is hydroxy, methoxy, ethoxy, cyanoethoxy, phenoxy, phenyl, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, 1,1-dimethylhydrazinium A⁻, trimethylammonium A⁻, or triethylammonium A⁻, wherein A⁻ is an anion.

14. A compound of the formula

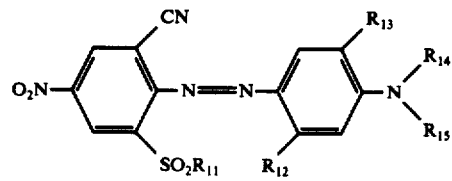

wherein

R₁₁ is lower alkyl, substituted lower alkyl, phenyl or substituted phenyl, wherein the substituent of substituted lower alkyl is chloro or bromo and each substituent of substituted phenyl is independently fluoro, chloro, bromo, iodo, hydroxy, methyl, amino, methylamino, nitro or acetamido, R₁₂ is hydrogen, lower alkyl, formamido, lower alkylcarbonylamino, substituted lower alkylcarbonylamino, methoxycarbonylamino, ethoxycarbonylamino, benzamido, methylsulfonylamino or ethylsulfonylamino, wherein the substituent of substituted lower alkylcarbonylamino is chloro, bromo, acetoxy, methoxy, ethoxy or phenoxy, R₁₃ is hydrogen, lower alkyl or lower alkoxy, R₁₄ is hydrogen or substituted lower alkyl wherein the substituent is cyano, hydroxy, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl, and R₁₅ is hydrogen, lower alkyl or substituted lower alkyl wherein the substituent is hydroxy, methoxy, ethoxy, cyanoethoxy, phenoxy, phenyl, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, 1,1-dimethylhydrazinium A⁻, trimethylammonium A⁻, or triethylammonium A⁻, wherein A⁻ is an anion.

15. A compound according to claim 14 wherein

R₁₁ is lower alkyl, phenyl or substituted phenyl, wherein each substituent of substituted phenyl is independently chloro, bromo, iodo, methyl, nitro or acetamido, R₁₂ is hydrogen, lower alkyl, formamido, lower alkylcarbonylamino, substituted lower alkylcarbonylamino, methoxycarbonylamino, ethoxycarbonylamino, benzamido or methylsulfonylamino, wherein the substituent of substituted lower alkylcarbonylamino is acetoxy or ethoxy, R₁₃ is hydrogen, lower alkyl or lower alkoxy, and R₁₅ is hydrogen, lower alkyl or substituted lower alkyl wherein the substituent is hydroxy, methoxy, phenyl, formyloxy, acetoxy, propionyloxy, methoxycarbonyl, ethoxycarbonyl or methoxycarbonyloxy.

16. A compound according to claim 15 wherein

R₁₁ is methyl, ethyl, phenyl, 4-bromophenyl, 4-iodophenyl, 2-methylphenyl, 4-methylphenyl, 3-nitrophenyl, 4-acetamido-3-chlorophenyl, 4-chloro- 3-methylphenyl, 2-chloro-4-nitrophenyl, 4-chloro-3-nitrophenyl or 3,4-dichlorophenyl, $R_{12}$ is hydrogen, methyl, formamido, acetamido, propionamido, ethoxyacetamido, acetoxyacetamido, methoxycarbonylamino, ethoxycarbonylamino, benzamido or methylsulfonylamino, $R_{13}$ is hydrogen, methyl, methoxy or ethoxy, $R_{14}$ is β-substituted ethyl wherein the substituent is cyano, methoxy, formyloxy, acetoxy, propionyloxy, methoxycarbonyl, ethoxycarbonyl, methoxycarbonyloxy or 2-acetoxyethoxy or 3-acetoxypropyl, and $R_{15}$ is hydrogen, ethyl, propyl, benzyl, β-substituted ethyl wherein the substituent is hydroxy, methoxy, phenyl, formyloxy, acetoxy, propionyloxy, methoxycarbonyl, ethoxycarbonyl, methoxycarbonyloxy or ethoxycarbonyloxy or 3-acetoxypropyl.

17. A compound of the formula

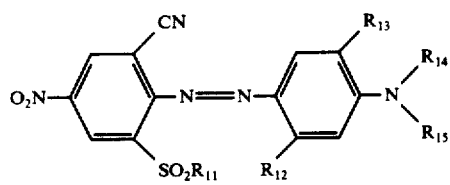

wherein $R_{11}$ is lower alkyl, substituted lower alkyl, phenyl or substituted phenyl, wherein the substituent of substituted lower alkyl is chloro or bromo and each substituent of substituted phenyl is independently fluoro, chloro, bromo, iodo, hydroxy, methyl, amino, methylamino, nitro or acetamido, $R_{12}$ is hydrogen, lower alkyl, formamido, lower alkylcarbonylamino, substituted lower alkylcarbonylamino, methoxycarbonylamino, ethoxycarbonylamino, benzamido, methylsulfonylamino or ethylsulfonylamino, wherein the substituent of substituted lower alkylcarbonylamino is chloro, bromo, acetoxy, methoxy, ethoxy or phenoxy, $R_{13}$ is hydrogen, lower alkyl or lower alkoxy, $R_{14}$ is hydrogen, lower alkyl or substituted lower alkyl wherein the substituent is cyano, hydroxy, methoxy, ethoxy, cyanoethoxy, formyloxy, acetoxy, propionyloxy, methoxycarbonyl, ethoxycarbonyl, methoxycarbonyloxy, ethoxycarbonyloxy, acetoxyethoxy or phenyl, and $R_{15}$ is hydrogen or substituted lower alkyl wherein the substituent is hydroxy, methoxy, ethoxy, cyanoethoxy, phenoxy, phenyl, methylamino, ethylamino, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy, methoxyethoxycarbonyl, 1,1-dimethylhydrazinium $A^-$, trimethylammonium $A^-$, or triethylammonium $A^-$, wherein $A^-$ is an anion.

18. A compound according to claim 17 wherein $R_{11}$ is lower alkyl, phenyl or substituted phenyl, wherein each substituent of substituted phenyl is independently chloro, bromo, iodo, methyl, nitro or acetamido, $R_{12}$ is hydrogen, lower alkyl, formamido, lower alkylcarbonylamino, substituted lower alkylcarbonylamino, methoxycarbonylamino, ethoxycarbonylamino, benzamido or methylsulfonylamino, wherein the substituent of substituted lower alkylcarbonylamino is acetoxy or ethoxy $R_{13}$ is hydrogen, lower alkyl or lower alkoxy, and $R_{14}$ is lower alkyl or substituted lower alkyl wherein the substituent is cyano, methoxy, formyloxy, acetoxy, propionyloxy, methoxycarbonyl, ethoxycarbonyl or methoxycarbonyloxy.

19. A compound according to claim 18 wherein $R_{11}$ is methyl, ethyl, phenyl, 4-bromophenyl, 4-iodophenyl, 2-methylphenyl, 4-methylphenyl, 3-nitrophenyl, 4-acetamido-3-chlorophenyl, 4-chloro-3-methylphenyl, 2-chloro-4-nitrophenyl or 4-chloro-3-nitrophenyl, $R_{12}$ is hydrogen, methyl, ethyl, formamido, acetamido, propionamido, ethoxyacetamido, acetoxyacetamido, methoxycarbonylamino, ethoxycarbonylamino, benzamido or methylsulfonylamino, $R_{13}$ is hydrogen, methyl, ethyl, methoxy or ethoxy, $R_{14}$ is methyl, ethyl, butyl, β-substituted ethyl wherein the substituent is cyano, methoxy, formyloxy, acetoxy, propionyloxy, methoxycarbonyl, ethoxycarbonyl or methoxycarbonyloxy or 3-acetoxypropyl, and $R_{15}$ is hydrogen, benzyl, β-substituted ethyl wherein the substituent is hydroxy, methoxy, 2-cyanoethoxy, phenoxy, phenyl, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy or 2-methoxyethoxycarbonyl or 3-acetoxypropyl.

20. A compound of the formula

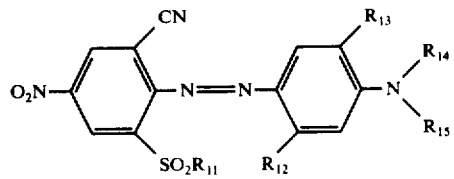

wherein $R_{11}$ is methyl, ethyl, bromomethyl, phenyl, 4-bromophenyl, 4-fluorophenyl, 4-iodophenyl, 2-methylphenyl, 4-methylphenyl, 3-nitrophenyl, 4-acetamido-3-chlorophenyl, 3-amino-6-chlorophenyl, 4-chloro-3-methylphenyl, 4-chloro-3-methylaminophenyl, 2-chloro-4-nitrophenyl, 4-chloro-3-nitrophenyl, 3,4-dichlorophenyl, 2-hydroxy-5-nitrophenyl or 2-methyl-5-nitrophenyl, $R_{12}$ is hydrogen, methyl, ethyl, formamido, acetamido, propionamido, methoxyacetamido, ethoxyacetamido, phenoxyacetamido, acetoxyacetamido, methoxypropionamido, ethoxypropionamido, methoxycarbonylamino, ethoxycarbonylamino, benzamido, methylsulfonylamino or ethylsulfonylamino, $R_{13}$ is hydrogen, methyl, ethyl, methoxy or ethoxy, $R_{14}$ is methyl, ethyl, butyl, β-substituted ethyl wherein the substituent is cyano, methoxy, formyloxy, acetoxy, propionyloxy, methoxycarbonyl, ethoxycarbonyl, methoxycarbonyloxy or 2-acetoxyethoxy or 3-acetoxypropyl, and $R_{15}$ is hydrogen, methyl, ethyl, propyl, benzyl, β-substituted ethyl wherein the substituent is hydroxy, methoxy, 2-cyanoethoxy, phenoxy, phenyl, formyloxy, acetoxy, propionyloxy, benzoyloxy, methoxycarbonyl, ethoxycarbonyl, phenoxycarbonyl, methoxycarbonyloxy, ethoxycarbonyloxy, phenoxycarbonyloxy or 2-methoxyethoxycarbonyl or 3-acetoxypropyl, with the proviso that when $R_{11}$ is methyl, $R_{12}$ is acetamido and $R_{13}$ is hydrogen, at least one of $R_{14}$ and $R_{15}$ is other than ethyl.

21. The compound according to claim 20 having the formula

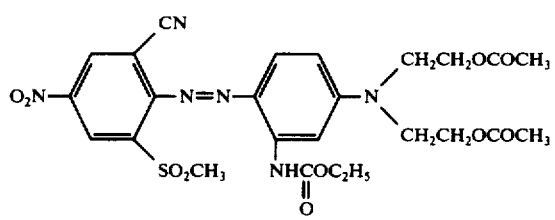

22. The compound according to claim 20 having the formula

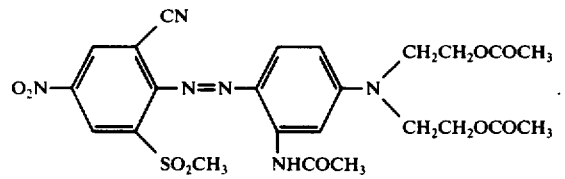

23. The compound according to claim 20 having the formula

24. The compound according to claim 20 having the formula

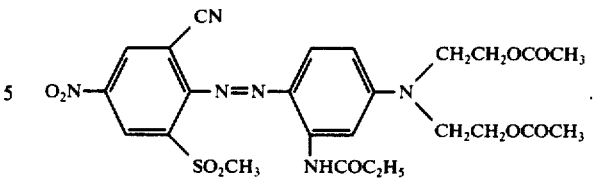

25. The compound according to claim 20 having the formula

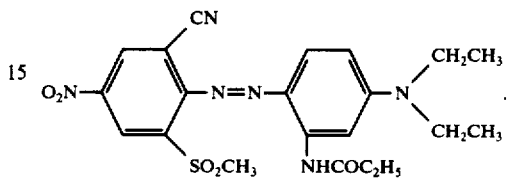

25. The compound according to claim 20 having the formula

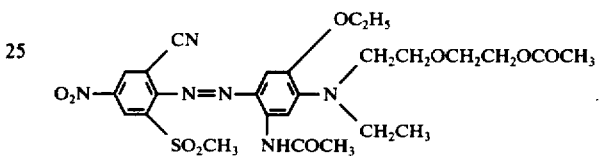

26. The compound according to claim 20 having the formula

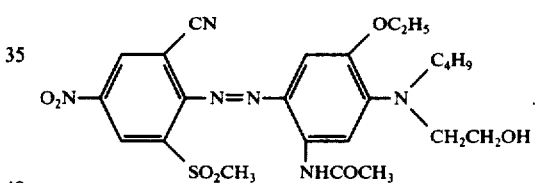

* * * * *